United States Patent [19]

Whited et al.

[11] Patent Number: 5,496,060
[45] Date of Patent: Mar. 5, 1996

[54] ONE PIECE DETACHABLE COVER FASTENER

[75] Inventors: Timothy J. Whited, Auburn Hills; Russell S. Gans, Westland, both of Mich.

[73] Assignee: Morton International, Inc., Chicago, Ill.

[21] Appl. No.: 368,934

[22] Filed: Jan. 5, 1995

[51] Int. Cl.$^6$ .................................................. B60R 21/20
[52] U.S. Cl. ........................ 280/728.3; 411/509; 24/297
[58] Field of Search ........................... 280/728.3, 728.2, 280/728.1, 732; 411/508, 509, 510, 908; 24/297, 453

[56] References Cited

U.S. PATENT DOCUMENTS

| | | | |
|---|---|---|---|
| 3,632,136 | 1/1972 | Foltz | 280/150 |
| 3,889,320 | 6/1975 | Koscik | 24/297 |
| 4,111,457 | 9/1978 | Kob et al. | 280/728 |
| 4,861,208 | 8/1989 | Boundy | 411/339 |
| 4,867,599 | 9/1989 | Sasajima | 411/508 |
| 4,941,678 | 7/1990 | Lauritzen et al. | 280/732 |
| 5,150,919 | 9/1992 | Sakakida et al. | 280/732 |
| 5,199,739 | 4/1993 | Fujiwara et al. | 280/732 |
| 5,211,421 | 5/1993 | Catron et al. | 280/728.2 |
| 5,353,549 | 10/1994 | Henderson et al. | 49/490.1 |
| 5,354,094 | 10/1994 | Matano et al. | 280/728.3 |
| 5,403,034 | 4/1995 | Gans et al. | 280/728.3 |

FOREIGN PATENT DOCUMENTS

| | | | |
|---|---|---|---|
| 1317354 | 1/1963 | France | 411/510 |
| 1-81184 | 5/1989 | Japan | 280/728.3 |

*Primary Examiner*—Karin L. Tyson
*Attorney, Agent, or Firm*—Charles N. Lovell; Gerald K. White

[57] ABSTRACT

A vehicle air bag installation including an inflatable air bag assembly mounted in a rectangular opening in the vehicle instrument panel for deployment of the air bag through the opening. A rectangular net fit cover door engages a recessed abutment around the opening when closed. The abutment includes a plurality of spaced apertures around the opening for receiving fasteners for attaching the cover to the instrument panel. The fasteners comprise elongate thermoplastic resin bodies having a bulbous head, flared wings or shoulders extending from the bulbous head for providing height alignment, an intermediate bulbous portion for centering the fastener in the aperture and a lower end that converges to a flange to facilitate insertion through the apertures. Integral lock-in-tabs are provided in the flange portion to lock the fastener to the abutment. Integral channels molded into the underside of the cover substrate releasably engage the heads of the fasteners. The cover having the fasteners secured to channels in its underside is assembled to the instrument panel by aligning the fasteners with the apertures in the abutment flange. The fasteners are inserted into the apertures and are locked therein by the lock-in tabs to prevent inadvertent premature movement of the cover. Upon deployment of the air bag, the cover is pushed out of the instrument panel surface with the fasteners disengaging from the channels in the underside of the cover.

13 Claims, 2 Drawing Sheets

ONE PIECE DETACHABLE COVER FASTENER

BACKGROUND OF THE INVENTION

This invention relates generally to vehicle passenger air bag systems and more particularly, to the mounting of a passenger side air bag cover for an inflatable air bag installed in a vehicle instrument panel.

An increasing number of passenger vehicles manufactured today are equipped with supplemental inflatable restraint systems for both the vehicle driver and front seat passenger commonly known as dual air bag systems. The passenger side air bag deploys through an opening in the instrument panel and is part of an assembly which includes an inflator and a reaction canister located in a recess in said instrument panel.

The instrument panel normally comprises a metal support structure covered by a panel comprising a rigid substrate on which is mounted a resilient foam pad having a flexible plastic decorative outer skin covering. The instrument panel support mounts the air bag assembly in the recess and incorporates a cover door which closes the deployment opening.

This cover door is a separate rectangular panel that is flush mounted in a rectangular opening in the surrounding panel area so that it can be opened and completely removed by the deploying air bag upon inflation. This type of door is usually attached to the instrument panel at its forward edge by a hinge or by a tether to cause the door to swing open about this attachment out of the path of the deploying air bag.

It is essential that this type of door be releasably installed in the panel opening so that it completely separates and moves out of the way of the deploying air bag. However, the door must remain attached to the instrument panel upon opening so that it does not become a hazard to occupant safety. A technique for fixing an air bag cover for a passenger side air bag of this type is disclosed in U.S. Pat. No. 5,211,421 to Catron et al.

It is desirable that the door be releasably secured by retaining means which exert a force that is sufficiently great to resist the door being prematurely opened so that the integrity of the air bag installation is preserved. This force must also be sufficiently small to assure that the door is released by the deploying air bag.

It is also desirable that the door be maintained releasably installed by retaining means which reliably remain attached to the instrument panel upon opening. It is important that the retaining means do not become detached during air bag deployment or encroach upon the path of the air bag as it deploys.

SUMMARY OF THE INVENTION

It is an object of this invention to provide fastener means for releasably securing an air bag cover door to an instrument panel which means operate to secure the door from being pried open under normal operating conditions to preserve the integrity of the air bag installation, but are designed to insure that the door is released upon firing of the air bag inflator.

It is another object of this invention to provide such fastener means which are designed to release from the door while reliably remain attached to the instrument panel.

A further object of the invention to provide a net fit cover which is removable by applying sufficient force to the cover to enable the air bag module to be readily serviced.

In one aspect, this invention features door retaining means for a passenger air bag installation in which an inflatable air bag is mounted in a recess in a vehicle instrument panel for deployment through a rectangular panel opening which has a recessed abutment at its peripheral edges. The rectangular opening is closed by a rectangular cover door that engages the abutment when installed and is secured to the instrument panel by the novel fastener means of this invention. The retaining means comprise a plurality of thermoplastic resin fasteners mounted at spaced intervals on the abutment, each fastener comprising an elongated bulbous upper end or head shaped for snapping into a channel provided in the cover, intermediate flared height alignment portions, a second intermediate bulbous centering portion and a lower or terminal flanged end. The bulbous head portion of the fastener means is designed to slide and snap into channels molded in the underside of the cover. Lock-in tabs formed as an integral part of the fastener are designed to engage and lock into apertures in the instrument panel to secure the door against inadvertent premature movement. Upon inflation of the air bag, the fasteners release from the molded channels in the cover underside leaving the fasteners secured or anchored in the instrument panel. The door is tethered to limit its displacement from the instrument panel. The fasteners are also useful for securing floating cover systems, i.e. one wherein the cover is hard mounted to the module but is designed to have a fit/finish float for adjusting to the instrument panel opening.

In another aspect, the invention features fasteners which have intermediate flared wing portions spaced from the bulbous head for providing height alignment and a curved intermediate bulbous centering region for centering and a lower end that converges to a flanged foot to facilitate insertion through apertures in the instrument panel.

In still another aspect, this invention features fasteners having integrally molded lock-in tabs for anchoring the fasteners in the instrument panel. The lock-in tabs are located at the lateral mid-point of the flanged foot portion and are flared to extend upwardly from said foot portion.

The fasteners are preferably made of thermoplastic resins. A preferred material for making the fasteners comprises a nylon blend, such as Zytel ST80 HS, manufactured by DuPont Plastics. It is to be understood, however, that any thermoplastic resin or a blend of resins that has the proper impact properties and thermal properties would also be useful for manufacturing the fastener.

DETAILED DESCRIPTION OF A PREFERRED EMBODIMENT

Figure 1:
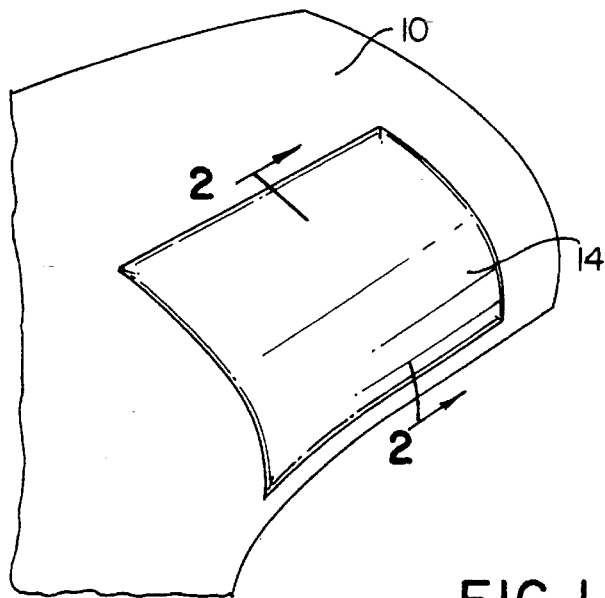
FIG. 1 is a perspective view of a passenger vehicle instrument panel, including an air bag deployment opening closed by a cover which is maintained in a closed position by retaining means according to this invention.

Referring to FIG. 1 of the drawings, a vehicle passenger compartment includes an instrument panel 10 located immediately rearward of the windshield. An air bag deployment opening 14 is formed in the instrument panel.

Figure 2:
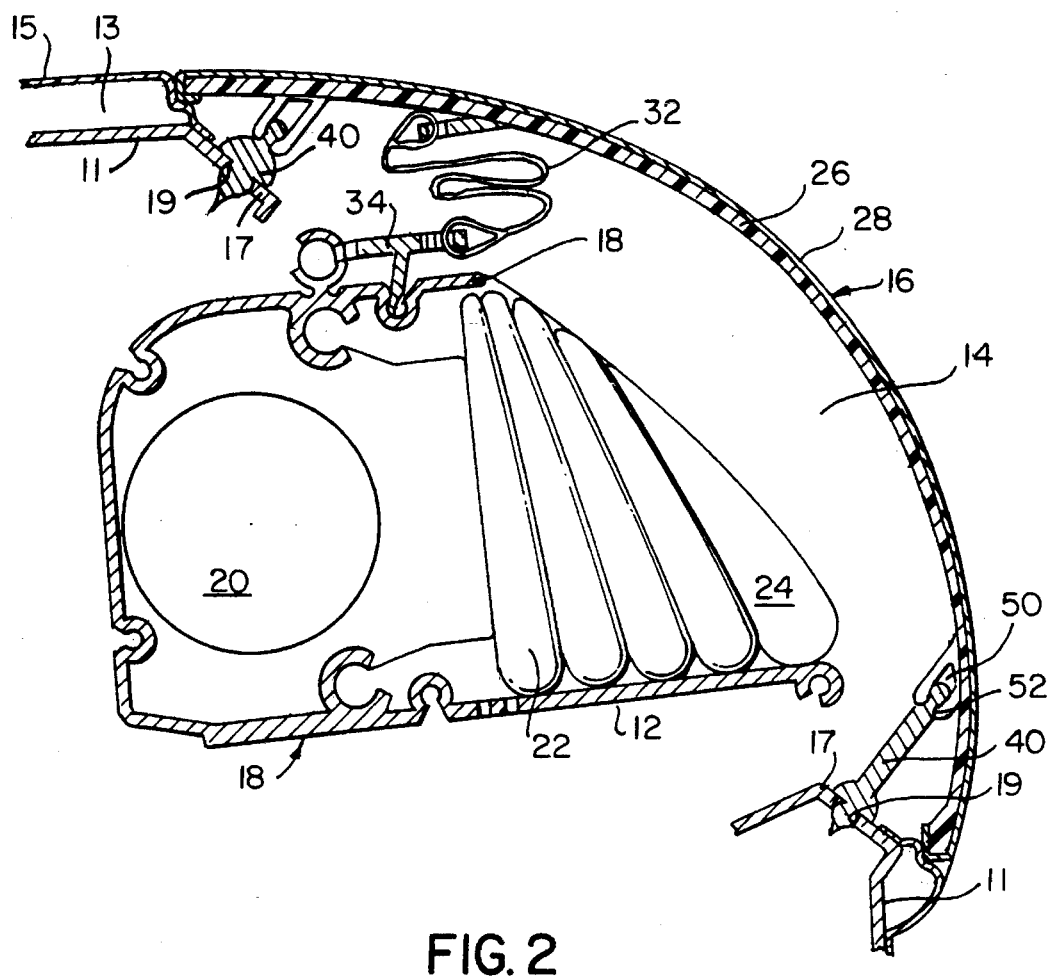
FIG. 2 is an enlarged sectional view, taken along line 2—2 of FIG. 1 showing the air bag module and the door retaining means.

Referring to FIG. 2, deployment opening 14 is closed by a cover door 16 over an air bag module 12. As illustrated, the air bag module 12 is provided with a reaction can 18 for housing and positioning the gas generator 20 and inflatable bag 22 and having an opening 24 toward the opening 14 of the instrument panel 10.

Cover door 16 forms continuation of instrumental panel 10 and comprises a rigid plastic substrate 26 which is covered by a decorative layer 28. On its underside, door 16 incorporates an anchor 34 for tether 32 between the door 16 and the reaction can 18. The other end of tether 32 is anchored to a bracket 34 on the reaction can 18.

Instrument panel 10 is comprised of a rigid substrate 11 that is covered by a foam layer 13 and a decorative layer 15. Substrate 11 includes peripheral flange 17 which forms an abutment engagement with the periphery of cover door 16 in closed position. The abutment flange 17 includes mounting apertures 19. In the exemplary embodiment of FIG. 1, six apertures would be used for retaining the cover door to the instrument panel. As illustrated in FIG. 2, apertures 19 mount fasteners 40 to secure the peripheral edge of cover door 16 within the air bag deployment opening 14 in instrument panel 10.

Figure 3:
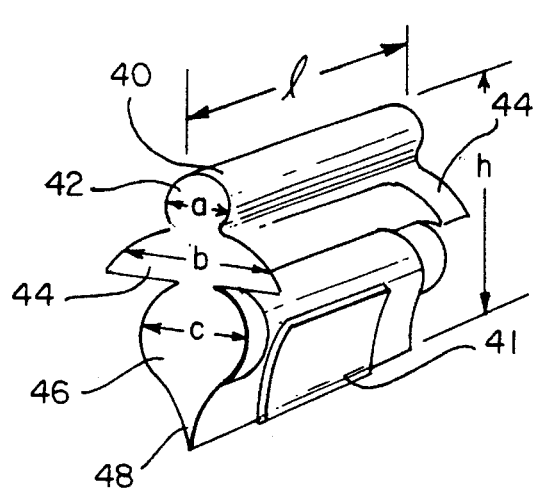
FIG. 3 is an elevation of a form of thermoplastic resins fastener, according to this invention.
Figure 5:
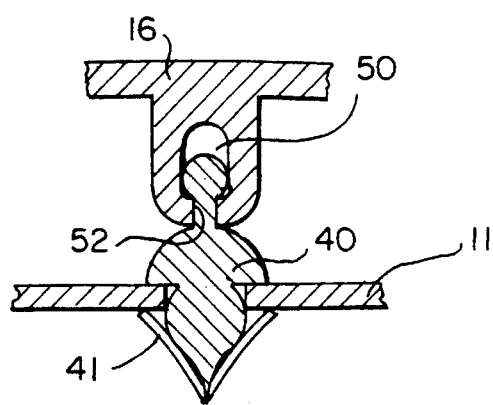
FIG. 5 is an end view of the fastener shown in FIG. 3 illustrating the mounting and fastening means in a partial cross-sectional view of an instrument panel substrate.

As illustrated in the embodiment of FIG. 3, fasteners 40 are made of a thermoplastic resin and include a first bulbous head portion 42, which terminates into flared shoulder or wing portions 44 located at the distal ends of the fastener and a second intermediate bulbous body portion 46 which converges inwardly to a terminal flange portion 48. Fasteners shaped so that the flared or wing portions 44 extend the entire lateral extent (dimension 1 in FIG. 3) of the fastener can be employed depending upon manufacturing acquirements. As further illustrated in FIG. 2, fasteners 40 used for installing the door can comprise a different form wherein an elongated neck portion is provided intermediate the bulbous head portion and the flared wing or shoulder portions. The length of the neck portion, of course, can vary depending upon the particular manufacturing requirements. As best shown in FIG. 5, the terminal flange portion 48 includes integral lock-in tabs 41, which are designed to be molded into the fastener, for securing the fastener to the instrument panel substrate 11.

Figure 4:
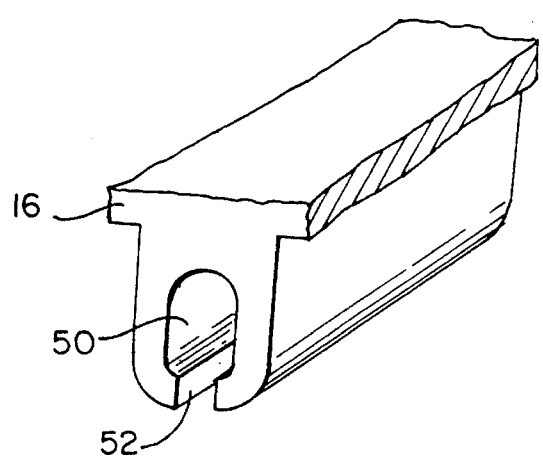
FIG. 4 is a cut away portion of the cover showing the channels for securing the fastener head.

Referring additionally to FIG. 4, fasteners 40 are first attached to the cover 16 by sliding and snapping head 42 into the channels 50 integrally molded into said cover 16. As illustrated in FIG. 4 the channels 50 are provided with a slot 52 that is somewhat narrower in width than the fastener head 42 so as to maintain a firm locking action. After placement of the six fasteners into a like number of channels 50 provided on the underside of cover 16, the cover is thereafter assembled to the instrument panel by aligning the fasteners with the apertures in the abutment flanges. The flange 48 of fastener 40 is inserted into the aperture 19 with the intermediate bulbous body portion 46 being received in the aperture 19 to center and align the fastener. The flared shoulder portions 44 and lock-in tabs 41 provide height alignment and anchor fasteners 40 into substrate 11. The assembly of cover 16 with the instrument panel by the manner described above results in a net fit cover, i.e. one in which two surfaces mate without interference or gaps.

By way of illustration and not limitation, the approximate dimensions of the fastener 40 shown in FIG. 3 are:

a—about 5 mm,
b—about 20 mm,
c—about 14 mm,
h—about 25–30 mm,
l—about 7 mm.

In practice of the invention, the actual dimensions of the fastener can vary from the above depending upon performance requirements. Further, as indicated above, the fastener 40 can comprise an elongated neck portion intermediate the bulbous head and flared wing or shoulder portions. While the length of said elongated neck portion and total height of the fastener will vary depending upon production requirements the dimensions of the remaining portions are approximately those set forth above.

Door 16 remains installed in panel opening 14, as illustrated in FIG. 2 and persists until and unless inflator 12 is actuated. The inflation of the air bag causes a load to act upon the interior surface of the cover door 16 and forces the air bag cover toward the interior of the vehicle. Specifically, the load displaces the air bag cover from its abutment with the instrument panel 10 whereupon its movement is sufficient to allow deployment of the air bag but is limited by tether 32. Throughout the initial door opening sequence, the fasteners 40 remain anchored in the abutment substrate 11 due to the lock-in tabs 41. The resisting force exerted by the lock-in tabs 41 maintains fasteners 40 attached to the abutment substrate 11. This retaining feature insures that the fasteners do not become prematurely detached and enter the vehicle compartment upon inflation of the air bag.

Another feature of the invention in using a net fit cover, as described, is that it allows for the air bag module to be serviced in the event this becomes necessary. If for some reason the air bag module needs servicing or repair before it has been deployed, the cover can be removed by a trained automobile serviceman by prying the cover from the instrument panel using appropriate instruments and force so as not to damage the cover or the instrument panel. Once the cover has been removed, the fastener 40 can be removed from the apertures 19 in the abutment substrate 11 by squeezing the lock-in tabs thus allowing fasteners 40 to be removed and reused for reassembling the cover after the necessary repair to the air bag module has been performed.

With this description of the invention in detail, those skilled in the art will appreciate that various modifications may be made to the invention without departing from the spirit thereof. Therefore it is not intended that the scope of the invention be limited to the specific embodiments illustrated and described. Rather, it is intended that the scope of the invention be determined by the appended claims and their equivalents.

We claim:

1. In an air bag installation for a vehicle in which an inflatable air bag is mounted in a recess in the instrument panel for deployment through a rectangular opening in said instrument panel, having a peripheral recessed abutment with spaced apertures, which is closed by a rectangular cover door that engages the abutment to form a net fit when installed and is secured to the instrument panel, retaining means for releasably securing the door installed in the panel opening, comprising a plurality of thermoplastic resin fasteners secured to a plurality of integral channels molded in the underside of the cover, each fastener having a bulbous head, juxtaposed spaced winged shoulder portions extending from said head, an intermediate bulbous portion, which has a greater circumference than said bulbous head and a terminal flanged portion for securing the cover door to the instrument panel inserted through said apertures in said recess of abutment, said channels molded into the underside of the cover door having slotted ends for releasably engaging the bulbous head of the fastener for securing the door against inadvertent premature disengagement from the instrument panel, whereby the application of sufficient force to said cover causes disengagement of the bulbous head of the fasteners from the channels molded in the underside of the door cover thus freeing the door cover to facilitate its opening.

2. The retaining means of claim 1 wherein the abutment has a plurality of spaced apertures for receiving a matched number of fasteners, each fastener being characterized by a terminal portion having a generally flanged shape that is endwise convergent to facilitate installation by insertion through the apertures.

3. The retaining means of claim 2, wherein there are six fasteners mounted in said spaced apertures.

4. The retaining means of claim 1, wherein each fastener has lock-in tabs for engagement with the abutment to prevent inadvertent premature disengagement of the cover door.

5. The retaining means of claim 1, wherein each fastener is made of thermoplastic resin.

6. The retaining means of claim 4 wherein the thermoplastic resin comprises a nylon blend.

7. In an air bag installation for a vehicle in which an air bag is mounted in a recess in the instrument panel for deployment through a rectangular panel opening, having a recessed peripheral abutment with a plurality of spaced apertures, the opening being closed by a rectangular cover door that engages the abutment when installed, retaining means for releasably maintaining the door installed in the panel opening, comprising a plurality of fasteners mounted along the periphery of the door, each fastener having a bulbous head, juxtaposed spaced winged shoulder portions extending from the said head, an underlying intermediate bulbous portion, which has a greater circumference than said bulbous head and a terminal flanged portion with integral lock-in tabs for attachment of the fastener through the apertures to the abutment, a plurality of integral channels molded into the underside of the cover for securing the fasteners bulbous head to said cover to inhibit inadvertent door opening, interengageable surfaces of the cover and peripheral abutment providing a net fit of the cover and instrument panel, whereby inflation of the air bag causes disengagement of the interengageable surfaces thus freeing the cover door to enable door opening, while retaining the fasteners mounted to the abutment.

8. The retaining means of claim 7, wherein each fastener is made of thermoplastic resin.

9. The retaining means of claim 8 wherein the thermoplastic resin comprise a nylon blend.

10. A unitary thermoplastic resin fastener comprising a bulbous head, juxtaposed spaced winged shoulder portions extending from said head, all underlying intermediate bulbous portion having a periphery that downwardly converges into a terminal flanged foot portion with complimentary integral lock-in tabs for securing the fastener to a support surface, wherein said intermediate bulbous portion has a greater circumference than said bulbous head.

11. The fastener of claim 10 wherein the lock-in-tabs are located at the lateral mid point of the flanged foot portion.

12. The fastener of claim 11 wherein the lock-in-tabs comprise flared portions that extend upwardly from said flanged foot portion.

13. The fastener of claim 10 wherein the thermoplastic resin comprise a nylon blend.

* * * * *